United States Patent
Liu et al.

(10) Patent No.: US 10,775,310 B2
(45) Date of Patent: Sep. 15, 2020

(54) RAMAN SPECTRUM DETECTION APPARATUS AND METHOD BASED ON POWER OF REFLECTED LIGHT AND IMAGE RECOGNITION

(71) Applicant: NUCTECH COMPANY LIMITED, Beijing (CN)

(72) Inventors: Haihui Liu, Beijing (CN); Hongqiu Wang, Beijing (CN); Jianhong Zhang, Beijing (CN)

(73) Assignee: NUTECH COMPANY LIMITED, Beijing (CN)

(*) Notice: Subject to any disclaimer, the term of this patent is extended or adjusted under 35 U.S.C. 154(b) by 0 days.

(21) Appl. No.: 16/232,339

(22) Filed: Dec. 26, 2018

(65) Prior Publication Data
US 2019/0195803 A1    Jun. 27, 2019

(30) Foreign Application Priority Data
Dec. 26, 2017   (CN) .......................... 2017 1 1442749

(51) Int. Cl.
*G01J 3/44*       (2006.01)
*G01N 21/65*   (2006.01)
(Continued)

(52) U.S. Cl.
CPC .............. *G01N 21/65* (2013.01); *G01J 3/021* (2013.01); *G01J 3/0205* (2013.01);
(Continued)

(58) Field of Classification Search
CPC ...... G01N 21/658; G01N 21/65; G01N 21/27; G01J 3/027; G01J 3/44; G01J 3/4412; G01J 2003/4418
See application file for complete search history.

(56) References Cited

U.S. PATENT DOCUMENTS

2007/0002319 A1   1/2007  Knopp et al.
2012/0274934 A1*  11/2012 Messerschmidt ...... G01N 21/65
                                                                    356/301
(Continued)

FOREIGN PATENT DOCUMENTS

CN        106770176 A    5/2017
EP        2 053 384 A1   4/2009
(Continued)

OTHER PUBLICATIONS

Extended European Search Report as issued in European Patent Application No. 18248026.9, dated Mar. 29, 2019.

*Primary Examiner* — Abdullahi Nur
(74) *Attorney, Agent, or Firm* — Pillsbury Winthrop Shaw Pittman LLP

(57) ABSTRACT

A detection apparatus, including: a laser configured to emit laser light towards an object to be detected; a Raman spectrometer configured to receive Raman light from the object; an imaging device configured to obtain an image of the object; a light sensor configured to receive light reflected and scattered by the object under irradiation of the laser light, and to determine the power of the received light; and a controller configured to control an operation of the detection apparatus based on the image obtained by the imaging device and the power determined by the light sensor. A detection method using the detection apparatus.

20 Claims, 3 Drawing Sheets

(51) Int. Cl.
*G01J 3/02* (2006.01)
*G01J 3/36* (2006.01)
*G01J 3/10* (2006.01)
*G01N 21/17* (2006.01)

(52) U.S. Cl.
CPC .......... *G01J 3/0227* (2013.01); *G01J 3/0248* (2013.01); *G01J 3/10* (2013.01); *G01J 3/36* (2013.01); *G01J 3/44* (2013.01); *G01J 3/4412* (2013.01); *G01N 2021/1765* (2013.01); *G01N 2021/1793* (2013.01); *G01N 2201/06113* (2013.01)

(56) References Cited

U.S. PATENT DOCUMENTS

| | | |
|---|---|---|
| 2017/0160201 A1 | 6/2017 | Nishizawa et al. |
| 2017/0184453 A1* | 6/2017 | Wang .................... G01J 3/2803 |
| 2018/0180551 A1 | 6/2018 | Zhang et al. |

FOREIGN PATENT DOCUMENTS

| | | |
|---|---|---|
| EP | 2 420 823 A1 | 2/2012 |
| WO | WO 2014/008359 A1 | 1/2014 |

* cited by examiner

RAMAN SPECTRUM DETECTION APPARATUS AND METHOD BASED ON POWER OF REFLECTED LIGHT AND IMAGE RECOGNITION

This application claims the benefit of priority of Chinese Patent Application No. 201711442749.1 filed on Dec. 26, 2017, the entire contents of which is hereby incorporated by reference.

TECHNICAL FIELD

Embodiments of the present disclosure generally relate to a detection apparatus and a detection method, and particularly to a Raman spectrum detection apparatus and a Raman spectrum detection method based on power of reflected light and image recognition.

DESCRIPTION OF RELATED ART

Raman spectrum analysis technology is a non-contact spectrum analysis technology based on Raman scattering effect, which can qualitatively and quantitatively analyze the composition of a substance. The Raman spectrum is a molecular vibration spectrum that can represent the fingerprint characteristics of molecules, and can be used for the inspection of a substance. A Raman spectrometer can inspect and identify a substance by the Raman spectrum generated by the Raman scattering effect of the object to be inspected with respect to exciting light.

In recent years, Raman spectrum analysis technology has been used in the fields of dangerous goods inspection and substance identification. In the field of substance identification, because the colors and shapes of various substances are different from each other, it is usually hard for a person to accurately determine the properties of a substance. A Raman spectrum is determined by the molecular energy level structure of the object to be inspected, and thus a Raman spectrum can be used as the "fingerprint" information of a substance for substance identification. Therefore, the Raman spectrum analysis technology has been used in the fields of customs, public safety, food & medicine, environment, etc.

SUMMARY

A laser having a high power density is generally used as an exciting light source in Raman spectrum detection, for example, near infrared laser light of, e.g., 785 nm. Such laser light has a stronger thermal effect. So, in a situation that components of the object to be detected are not known, a rushed detection made by using such laser light may possibly cause the object to be detected to be burned and/or damaged by the laser light. If the object to be detected is a flammable and/or explosive chemical, such rushed detection may lead to burning, exploding or the like, possibly resulting in personal and/or property loss.

An object of the present disclosure is to at least partly solve or alleviate at least one aspect of the above mentioned or other disadvantages or problems in the art.

According to an aspect of the present disclosure, there is provided a detection apparatus.

According to an exemplary embodiment, the detection apparatus may include: a laser configured to emit laser light towards an object to be detected; a Raman spectrometer configured to receive Raman light from the object; an imaging device configured to obtain an image of the object; a light sensor configured to receive light reflected and scattered by the object under irradiation of the laser light, and to determine power of the received light; and a controller configured to control an operation of the detection apparatus based on the image obtained by the imaging device and the power determined by the light sensor.

According to an embodiment, the controller may be further configured to compare the power determined by the light sensor to a threshold power, and to control the operation of the detection apparatus according to a comparison result of the power determined by the light sensor to the threshold power.

According to an embodiment, the imaging device may be further configured to obtain an image of the object as a reference image before the laser emits the laser light, and to obtain a real-time image of the object in real time while the laser emits the laser light for detection; and the controller is further configured to compare each frame of picture of the real-time image to the reference image, and to control the operation of the detection apparatus according to a comparison result of each frame of picture of the real-time image to the reference image.

According to an embodiment, the imaging device may be further configured to obtain a real-time image of the object in real time while the laser emits the laser light for detection of the object; and the controller is further configured to compare a first frame of picture, as reference image, of the real-time image to one or more other frames of picture of the real-time image, and to control the operation of the detection apparatus according to a comparison result of the one or more other frames of picture of the real-time image to the first frame of picture of the real-time image.

According to an embodiment, the detection apparatus may further include an alarm device, and the controller is further configured to instruct the alarm device to issue an alarm signal while or after instructing the detection apparatus to terminate the detection.

According to an embodiment, the detection apparatus may further include a fixing device configured to position the object such that a surface to be detected of the object is essentially perpendicular to a direction of the laser light irradiated onto the surface.

According to an embodiment, the fixing device may include: a light aperture through which the laser light emitted by the laser passes to irradiate onto the surface to be detected of the object; and an inner positioning surface arranged essentially perpendicular to a direction of the laser light passing through the light aperture, wherein the surface to be detected of the object is arranged to abut against the inner positioning surface.

According to an embodiment, the detection apparatus may further include a first beam splitter disposed in a Raman light path from the object to the Raman spectrometer, the first beam splitter configured to guide the laser light emitted from the laser to the object and to transmit the Raman light from the object through the first beam splitter to the Raman spectrometer.

According to an embodiment, the detection apparatus may further include a second beam splitter disposed in the Raman light path from the object to the Raman spectrometer, the second beam splitter configured to reflect visible light such that the object is imaged by the imaging device and to allow the laser light emitted from the laser and the Raman light from the object to pass through the first beam splitter.

According to an embodiment, the detection apparatus may further include a third beam splitter disposed in the Raman light path from the object to the Raman spectrometer at a position downstream of the first beam splitter and the second beam splitter, the third beam splitter configured to reflect, towards the light sensor, portions of the laser light reflected and scattered by the object and transmitted through the first beam splitter and the second beam splitter, and to allow the Raman light from the object to pass through the third beam splitter to the Raman spectrometer.

According to an embodiment, the detection apparatus may further include at least one selected from the following: a first filter disposed in the Raman light path at a position downstream of the third beam splitter, and configured to filter out Rayleigh light of a light signal; a second filter disposed between the laser and the first beam splitter and configured to limit a wavelength of the laser light emitted by the laser within a desired wavelength band; and/or a third filter disposed between the imaging device and the second beam splitter and configured to filter out the laser light.

According to an embodiment, the detection apparatus may further include at least one selected from the following: a first convergent lens or lens set disposed between the second beam splitter and the object; a second convergent lens or lens set disposed between the imaging device and the second beam splitter; a third convergent lens or lens set disposed between the Raman spectrometer and the third beam splitter; and/or a fourth convergent lens or lens set disposed between the light sensor and the third beam splitter.

According to an embodiment, the detection apparatus may further include a light source configured to illuminate the object.

According to an embodiment, the first beam splitter has a transmittance selected from 5% to 30% for laser light having an incident angle of 45 degrees.

According to an aspect of the present disclosure, there is provided a detection method by using the detection apparatus described in any of the embodiments described herein.

In an exemplary embodiment, the method may include: emitting, to the object to be detected, a laser light pulse for pre-detection; receiving reflected laser light and scattered laser light coming from the object and generated by the laser light pulse; determining the power of the reflected and scattered laser light; comparing the determined power to a threshold power; performing a normal detection if the determined power crosses or equals (e.g., greater than or equal to) the threshold power; and terminating the detection if the determined power does not cross or equal to (e.g., is smaller than) the threshold power. The step of performing a normal detection may include: obtaining an image of the object to be detected as a reference image before emitting of the laser light; obtaining a real-time image of the object in real time during emitting of the laser light for detection; comparing the real-time image to the reference image; and controlling the operation of the detection apparatus according to a comparison result of the real-time image to the reference image.

According to an aspect of the present disclosure, there is provided another detection method by using the detection apparatus described in any of the embodiments described herein.

In an exemplary embodiment, the method may include: emitting, to the object to be detected, a laser light pulse for pre-detection; receiving reflected laser light and scattered laser light coming from the object and generated by the laser light pulse; determining the power of the reflected laser light and scattered laser light; comparing the determined power to a threshold power; performing a normal detection if the determined power crosses or equals (e.g., greater than or equal to) the threshold power; and terminating the detection if the determined power does not cross or equal to (e.g., is smaller than) the threshold power. The step of performing a normal detection may include: obtaining a real-time image of the object in real time during emitting of the laser light for detection, and taking a first frame of picture of the real-time image as a reference image; comparing another frame of picture of the real-time image to the first frame of picture; and controlling the operation of the detection apparatus according to a comparison result of the other frame of picture of the real-time image to the first frame of picture.

BRIEF DESCRIPTION OF THE DRAWINGS

Exemplary embodiments of the present disclosure will be described as examples with reference to the accompanying drawings, in which.

DETAILED DESCRIPTION OF EXEMPLARY EMBODIMENTS

Figure 1:
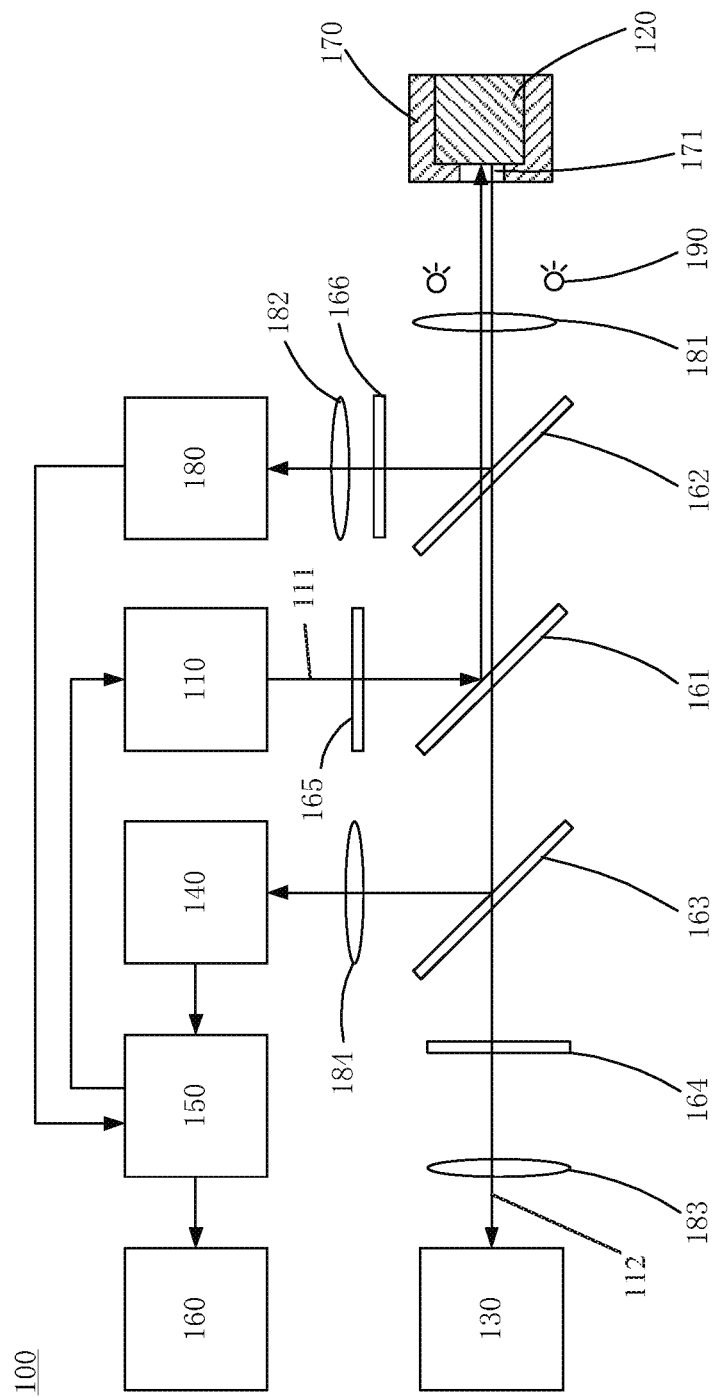
FIG. 1 is a block diagram schematically showing a detection apparatus according to an embodiment of the present disclosure.

Exemplary embodiments of the present disclosure will be described hereinafter in detail with reference to the attached drawings. Throughout the description, like reference numerals refer to like elements or features. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general inventive concept of the present disclosure, there is provided a detection apparatus. The detection apparatus includes: a laser configured to emit laser light towards an object to be detected; a Raman spectrometer configured to receive Raman light from the object; an imaging device configured to obtain or capture an image of the object; a light sensor configured to receive light reflected and backward Rayleigh-scattered by the object under irradiation of the laser light, and to determine power of the received light; and a controller configured to control an operation of the detection apparatus based on the image obtained by the imaging device and the power determined by the light sensor.

FIG. 1 is a schematic diagram of a detection apparatus according to an embodiment of the present disclosure. As shown in FIG. 1, in this embodiment, the detection apparatus 100 includes: a laser 110 configured to emit laser light 111 towards an object 120 to be detected; a Raman spectrometer 130 configured to receive a Raman light signal 112 from the object 120; an imaging device 180 configured to obtain or capture an image of the object 120; a light sensor 140 configured to receive light reflected and backward Rayleigh-scattered by the object 120 under irradiation of the laser light, and to determine power of the received light; and a controller 150 configured to control an operation of the detection apparatus 100 based on the image obtained by the imaging device and the power determined by the light sensor.

In order to excite a Raman scattering effect from a detected object, laser light emitted by a laser generally has a higher power density, which will generate a strong thermal effect; if the color of the detected object is darker (for example, dark gray, black or the like), the object will absorb more laser light. Thereby the object increases rapidly in its surface temperature, which may cause the object to be partially melted or ablated. Optionally, if the detected object has a lower melting point, radiation of the laser light will easily result in, even in a case where the color of the detected object is not dark, the temperature of a detected portion of the object increasing above the melting point, thereby possibly causing the detected portion of the object to be melted or ablated.

In order to avoid, e.g., the above phenomenon, techniques of the present disclosure provide a light sensor for determining color shade or darkness of an object to be detected through, e.g., a pre-detection before a normal detection, so as to determine whether or not the color shade or darkness of the object is adapted to a laser light detection, so that a normal laser light detection will be implemented only when the color shade or darkness of the object is adapted to the laser light detection; furthermore, an imaging device may be provided for obtaining a real-time image of the object during the normal laser light detection of the object, so as to judge whether or not a significant change occurs in shape or color of the object or its detected portion during the normal detection (the significant change in shape or color may imply that the detected object or a portion thereof is ablated or melted by the laser light during the detection), so that it may determine according to a judgment result whether the detection could be continued or a suitable security measure needs to be taken, for example, terminating detection and/or issuing an alarm signal.

As will be understood by those skilled in the art that a white or light-colored object has high light reflectivity and Rayleigh scattering rate. So, the color shade or darkness of the detected object may be determined by detecting the power of laser light reflected and scattered by the object, and then the detection operation of the detection apparatus may be controlled based on the determined color shade or darkness of the object.

In the present disclosure, the light sensor 140 may include any appropriate photoelectric conversion element, for example, including but not limited to: a photodiode, a phototriode, a photo-resistor or the like. In an exemplary embodiment of the present disclosure, the light sensor 140 includes a photodiode. The photodiode is a photosensitive photoelectric element, which will generate a reverse current that increases as the power of light received by it increases. So, the specific value of the power of the light received by the photoelectric element may be determined based on a specific value of the reverse current of the photoelectric element. Similarly, if the light sensor 140 includes a photo-resistor, the power of light received by the photo-resistor may be determined through reverse derivation based on a change in resistance of the photo-resistor.

Based on techniques of the present disclosure, it will be understood by those skilled in the art that if the detected object 120 is a white or light-colored object, it will reflect and scatter more laser light, and so the power of the laser light reflected and scattered from the object 120 and received by the light sensor 140 will be greater. Thus, a threshold power $I_{th}$ may be preset, so that if it is determined that the power I of the light received by the light sensor 140 crosses or equals to (e.g., is greater than or equal to) the threshold power $I_{th}$, it can be determined that the detected object is a white or light-colored object, otherwise it may be determined that the detected object is a dark or black object. Or, if it is determined that the power I of the light received by the light sensor 140 crosses or equals to (e.g., is less than or equal to) the threshold power $I_{th}$, it can be determined that the detected object is a dark or black object, otherwise it may be determined that the detected object is a white or light-colored object Calculation of the power I of the light received by the light sensor 140 may be implemented by software or algorithm pre-stored in a storage device of a field operated-computer, or in a computer in a remote control center, or in the controller 150, or by various specific devices or circuits. For example, if a photodiode is utilized, a reverse current of the photodiode may be measured such that the power of light received by the photodiode may be determined. These concepts are readily comprehensible to those skilled in the art and will not be described in detail herein. In addition, specific value of the threshold power $I_{th}$ may be set according to specific conditions such as technical parameters of the detection apparatus, the detection environment or the like.

In an embodiment, the controller 150 may be configured to compare the power I determined by the light sensor 140 to the threshold power $I_{th}$, such that: if the power I of the received light crosses or equals to the threshold power $I_{th}$ (e.g., $I \geq I_{th}$), it may be determined that the currently detected object 120 is a white or light-colored object, and that a laser light detection may be performed. Then, the controller instructs the laser 110 to emit laser light for detection. If the power I of the received light does not cross or equal to (e.g., is smaller than) the threshold power $I_{th}$ (e.g., $I < I_{th}$), it may be determined that the currently detected object 120 is a dark or black object, and has a higher absorptivity of energy from the laser light and faces a risk of being ablated. In that case, the controller may instruct the detection apparatus to terminate the detection.

In an exemplary embodiment, after starting of a detection procedure and before a normal detection using laser light, the laser 110 may firstly emit, towards the object 120 placed at a position to be detected, a laser light pulse (for example, a laser light pulse with a duration of 5 milliseconds) for pre-detection. The light sensor 140 receives reflected and scattered light generated from the object 120 due to irradiation of the pulse laser light and determines power I of the reflected and scattered light received by the light sensor 140 so as to judge whether the power I is greater than, equal to or smaller than the threshold power $I_{th}$. Based on a relationship between the power I and the threshold power $I_{th}$, the controller 150 determines whether or not it is suitable to perform a normal laser light detection on the current object to be detected. For example, the controller 150 may be configured to: if the power I is greater than or equal to the threshold power $I_{th}$, determine that it is suitable to perform a normal laser light detection on the object; and if the power I is smaller than the threshold power $I_{th}$, determine that it is not suitable to perform a normal laser light detection on the object. If the controller 150 judges that it is suitable to perform a normal laser light detection on the current object to be detected, the controller 150 may instruct the laser 110 to start emitting a continuous laser light beam for detection of the object 120. If the controller 150 judges that it is not suitable to perform a laser light detection on the current object to be detected, the controller 150 may directly terminate the detection procedure, without requiring the laser 110 to emit any continuous laser light beam for the normal detection.

Further, according to an embodiment, the detection apparatus 100 may include an alarm device 160. If the controller 150 determines the object is not adapted to a laser light detection, the controller 150 may instruct, while or after terminating the detection procedure, the alarm device 160 to issue an alarm signal so as to warn a nearby operator that the current object to be detected is not adapted to be detected or not suitable to be continuously detected due to its dark color and/or that the detection operation has been terminated. The alarm signal may include, e.g., a special acoustical signal and/or an image signal.

It is noted that a same object (or samples having a same color shade or darkness) may be placed in various ways. Thus, its/their surface(s) to be detected will form different angles with respect to a direction of the detection laser light beam, which may result in different powers of the reflected and scattered lights coming the object and received by the light sensor. Similarly, objects having different color shades or darkness may have different shapes and/or be placed in different ways, thus it is possible that the powers of the reflected and scattered lights coming from different objects and received by the light sensor may be same. In the above-described two cases, the power received by the light sensor will lack fidelity, which may result in erroneous judgment of the controller with respect to the color shade or darkness of the object, thereby possibly leading to occurrence of dangerous results.

In order to avoid or eliminate as much as possible adverse effects on the power of the reflected and scattered light caused due to factors such as different shapes of objects, different arrangements or the like, in an embodiment, the detection apparatus 100 may further include a fixing device 170 for fixing the object 120.

The fixing device 170 may be, for example, a box or clip type fixing device or other appropriate fixing device or structure for positioning a surface to be detected of the object 120 to be detected essentially perpendicular (e.g., exactly perpendicular or within plus or minus 5 degrees of perpendicular) to a direction of the laser light beam. For example, in the exemplary embodiment shown in FIG. 1, the fixing device 170 is a box type fixing device having an inner positioning surface essentially perpendicular to the direction of the laser light beam. The surface to be detected of the object 120 closely abuts against the inner positioning surface of the fixing device 170 and thus is also positioned essentially perpendicular to the direction of the laser light beam. The back part of the object 120 may be further fixed by one or more other suitable fixing parts (not shown in FIG. 1) of the fixing device 170. A light aperture 171 may be provided in a front wall of the fixing device 170, such that the laser light beam may pass through the light aperture 171 to irradiate onto the surface to be detected of the object 120 fixed in the interior of the fixing device 170. The light aperture 171 may have a shape in form of a rectangular slit, a rectangular hole or a circular hole.

The imaging device 180 may include a CCD imaging device, a CMOS imaging device or other known imaging device. The image of the object may be an image of the whole of the object obtained in a certain direction, or an image of a portion of the object, which depends on the dimensions of the object 120 to be detected, one or more parameters of the detection apparatus 100 such as a detection area, whether or not there is a fixing device 170 for fixing the object 120 and/or a configuration of the fixing device 170. For example, if the object to be detected is a gemstone having a very small size, the imaging device may obtain an image of the whole of one side face of the object; if the object to be detected has a larger size, the imaging device may image a local portion to be detected of the object.

When a part of the object is melted or ablated, the color and/or shape of the part will be changed. When comparing the real-time image of the object to a reference image, if it is found that the color and/or shape of the object or a part of the object is changed, the controller may determine that the detected object or the part thereof has been ablated by the laser.

Comparison between the reference image and the real-time image may be implemented in various ways.

For example, in an implementation, the reference image is an image of the object obtained in advance before the normal detection. Thus, in this implementation, the controller 150 is further configured to compare each frame of picture of a real-time image obtained during the normal detection to the reference image obtained in advance. The step of obtaining the reference image may be implemented before or after the pre-detection of the object 120 made by the laser 110. In an exemplary embodiment, the reference image of the object 120 may be obtained after the pre-detection of the object 120 made by the laser 110 and before the normal detection of the object 120 made by the laser 110.

In an implementation, the reference image may be a part of the real-time image. For example, the reference image is a first frame of picture of the real-time image, and used for comparison with each of one or more frames of pictures of the real-time image other than the first frame of picture. Thus, in this implementation, the controller 150 is further configured to take a first frame of picture of the real-time image as the reference image and to compare the reference image to one or more other frames of picture of the real-time image. Compared to the prior implementation, this implementation may be more advantageous because during the detection, the laser light beam itself can affect the image obtained by the imaging device 180, which is not in favor of accurately comparing images.

In an exemplary embodiment, the determination of whether or not the object is ablated is based on a change in gray scale of a pixel of the image. For example, the detection apparatus 100 may include an image processor (not shown in the Figures) for gray scale processing of the reference image and the real-time image obtained by the imaging device so as to obtain gray scale values (a value in a range from 0 to 255) of respective pixels of the reference image and the real-time image. In an example, the image processor may be integrated into the imaging device 180 (that is, the imaging device 180 includes the image processor); in another example, the image processor may be integrated into the controller 150 (that is, the controller 150 includes the image processor); in other examples, the image processor may be provided in a field operated-computer or in a remote control center. In an embodiment, gray scale processing of the images of the detected object may be implemented by software or algorithms stored in a storage device of a field operated-computer, in a computer in a remote control center or in the controller 150 so as to obtain gray scale values of respective pixels of the images.

After determining the gray scale values of respective pixels of the reference image (the image of the object obtained in advance before the normal detection, or the first frame of picture of the real-time image) and the real-time image, the detection apparatus 100 may compare, for example through computer algorithms or a specific processor, the gray scale value of each of pixels of the real-time image to the gray scale value of a corresponding one of the pixels of the reference image (if the first frame of picture of the real-time image is taken as the reference image, the gray scale values of pixels of the first frame of picture of the real-time image will be compared to the gray scale values of pixels of one or more other frames of picture of the real-time image; the same applies below). If a certain frame of picture of the real-time image includes pixels, the number of which exceeds a preset number or exceeds a preset percentage of a total pixel number of the real-time image, and the gray scale values of those pixels are different from those of pixels of the reference image, it shows that a significant change has occurred in shape of the detected portion of the object, and thus it may be determined that the object 120 or a portion thereof has been ablated. After determining the detected object or a portion thereof has been ablated, the controller 150 may control the detection apparatus 100 to terminate the detection. In an embodiment, the controller 150 may be further configured to instruct the alarm device 160 to issue an alarm signal, so as to warn a related operator that the current object to be detected has been ablated and/or that the detection operation has been terminated. The alarm signal may include, e.g., a special acoustical signal and/or an image signal. The gray scale value of each of pixels of the real-time image is compared to the gray scale value of a corresponding one of pixels of the reference image, such that if it is determined that the gray scale values of all pixels are not changed, or only a small amount of pixels are changed in gray scale value, or the number of pixels whose gray scale values have been changed occupies a small percentage of the total pixel number, it shows that the shape of the detected portion of the object is not significantly changed (for example, may be caused due to a system error or other reasons), and then the detection procedure may continue. For example, a pixel number threshold or percentage threshold may be preset, so that if the number of pixels whose gray scale values are changed exceeds the number threshold or a percentage of the number of pixels whose gray scale values are changed to the total pixel number exceeds the percentage threshold, it may be determined that the detected object is ablated. The above number threshold or percentage threshold may be set according to actual conditions, for example, may be set according to parameters such as a detection range of the detection apparatus or an imaging range of the image.

In an exemplary embodiment, determination of whether or not the detected object is ablated is based on a change in color of a pixel of the image. For example, the color of each pixel in each frame of picture of the reference image and the real-time image of the object obtained by the imaging device may be recognized or identified by the detection apparatus 100 by means of an image processor (not shown in the Figures) or computer algorithms, thereby obtaining colors of respective pixels of respective frames of picture of the reference image and the real-time image.

After determining the colors of respective pixels of respective frames of picture of the reference image and the real-time image, the detection apparatus 100 may compare, for example through a computer algorithm or a specific processor, the color of each of the pixels in each frame of picture of the real-time image to the color of a corresponding one of pixels of the reference image. If a certain frame of picture of the real-time image includes pixels and the number of the pixels exceeds a preset number or exceeds a preset percentage of a total pixel number of the real-time image and the colors of the pixels are different from those of pixels of the reference image, it shows that a significant change has occurred in shape of the detected portion of the object, and thus it may be determined that the object 120 or a portion thereof has been ablated. After determining the detected object or a portion thereof has been ablated, the controller 150 may control the detection apparatus 100 to terminate the detection. In a further embodiment, the controller 150 may be further configured to instruct the alarm device 160 to issue an alarm signal, so as to warn a related operator that the current object to be detected has been ablated and/or that the detection operation has been terminated. The alarm signal may include, e.g., a special acoustical signal and/or an image signal. The color of each of pixels of the real-time image is compared to the color of a corresponding one of the pixels of the reference image, such that if it is determined that the colors of all pixels are not changed, or only a small amount of pixels are changed in color, or the number of pixels whose colors have been changed occupies a small percentage of the total pixel number, it shows that the shape of the detected portion of the object is not significantly changed (for example, may be caused due to a system error or other reasons), and then the detection procedure may continue. For example, a pixel number threshold or percentage threshold may be preset, so that if the number of pixels whose colors are changed exceeds the number threshold or a percentage of the number of pixels whose colors are changed to the total pixel number exceeds the percentage threshold, it may be determined that the detected object is ablated.

The above number threshold or percentage threshold may be set according to actual conditions, for example, may be set according to one or more parameters such as a detection range of the detection apparatus or an imaging range of the image.

In the present disclosure, the detection apparatus 100 may further include an appropriate storage device (not shown in Figures). After the reference image is obtained, it may be stored in the storage device so that the reference image may be retrieved from the storage device whenever necessary, for subsequently being compared with the real-time image.

In order to compare images more accurately, before determining the gray scale values or colors of the reference image and the real-time image, the images may be enhanced and processed by the detection apparatus 100 through one or more various algorithms, thereby improving accuracy of recognizing gray scale values or colors.

According to an embodiment of the present disclosure, the detection apparatus 100 may include one or more optical devices for configuring or guiding a light path between the laser 110 and the detected object 120 (hereinafter referred to as "laser light path"), a light path between the detected object 120 and the Raman spectrometer 130 (hereinafter referred to as "Raman light path"), a light path between the light sensor 140 and the detected object 120 (hereinafter referred to as "power detection light path"), and/or a light path between the imaging device 180 and the detected object 120 (hereinafter referred to as "imaging light path").

As shown in FIG. 1, the optical devices may include a first beam splitter 161 disposed in the Raman light path and configured to guide the laser light emitted from the laser 110 to the detected object 120 and to not block or adversely affect transmission of a light signal (Raman scattering light) from the detected object 120 to the Raman spectrometer 130.

As an example, the first beam splitter 161 may be a long-wave pass dichroic mirror. A long-wave pass dichroic mirror generally allows light having a wavelength greater than a predetermined wavelength to pass therethrough and reflect light having a wavelength smaller than the predetermined wavelength. In a case where a Raman scattering effect is excited by using laser light to irradiate the detected object, most of the Raman scattering light will decrease in frequency and increase in wavelength. Thus, the long-wave pass dichroic mirror may be suitably configured such that laser light emitted from the laser 110 and having a predetermined wavelength will be reflected towards the detected object 120 and that Raman scattering light coming from the detected object 120 and having an increased wavelength will be allowed to pass through the long-wave pass dichroic mirror to be transmitted towards the Raman spectrometer 130. Specific configuration of the long-wave pass dichroic mirror may be set according to the wavelength of the laser light emitted by the laser 110.

Although in the above examples, the long-wave pass dichroic mirror is described as an example of the first beam splitter 161, the first beam splitter 161 of the present disclosure is not only limited to the long-wave pass dichroic mirror, and the above function may be achieved by other known beam splitting arrangements.

With provision of the first beam splitter 161, the laser light path and the Raman light path may be at least partly combined, thereby facilitating reduction of the overall dimension of the detection apparatus.

As shown in FIG. 1, the optical devices may further include a second beam splitter 162, which is second beam splitter is disposed in the Raman light path, is configured to reflect visible light such that the object to be detected is imaged by the imaging device 180, and allows the laser light emitted from the laser 110 and the Raman light from the detected object 120 to pass therethrough.

As an example, the second beam splitter 162 may include a long-wave pass dichroic mirror. For example, if near-infrared laser light having a wavelength of 785 nm is used (that is, the laser 110 is configured to emit near-infrared laser light having a wavelength of 785 nm), and if a long-wave pass dichroic mirror is used as the second beam splitter 162, the second beam splitter 162 may reflect visible light, which generally has a wavelength in a range from 380 nm to 780 nm, while allowing infra-red light having a wavelength greater than that of the visible light to pass therethrough. As such, imaging, by the imaging device 180, of the object to be detected will not be affected, and transmission of the laser light emitted by the laser 110 and the Raman scattered light from the detected object 120 will also not be affected. A specific threshold of the long-wave pass dichroic mirror may be set or configured as required (for example, based on one or more parameters such as the wavelength of the laser light). In embodiments of the present disclosure, the second beam splitter 162 is not limited to the long-wave pass dichroic mirror, and the above function of the second beam splitter 162 may be achieved by selecting another known beam splitting arrangement.

With provision of the second beam splitter 162, the imaging light path and the Raman light path may be at least partly combined, thereby facilitating reduction of the overall dimension of the detection apparatus.

It is noted that in the above embodiments, the operational principle of the present disclosure is only described by way of examples, but the present disclosure is not limited to the above exemplary embodiment. For example, the first beam splitter 161 and the second beam splitter 162 are not limited to the long-wave pass dichroic mirror. For example, in an embodiment, the laser 110 emits ultraviolet laser light, and in this case, the first beam splitter 161 is a long-wave pass dichroic mirror, while the second beam splitter 162 may be a short-wave pass dichroic mirror.

As shown in FIG. 1, in the Raman light path, the second beam splitter 162 is arranged closer to the object 120 than the first beam splitter 161 (that is, the second beam splitter 162 is arranged at an upstream side of the Raman light path, while the first beam splitter 161 is arranged at a downstream side of the Raman light path). However, the present disclosure is not limited to this specific arrangement. For example, if the laser 110 emits ultraviolet laser light, the second beam splitter 162 may be arranged at the downstream side of the Raman light path relative to the first beam splitter 161, and the second beam splitter 162 may be a short-wave pass dichroic mirror.

Further, as shown in FIG. 1, the optical devices may further include a third beam splitter 163, which is also disposed in the Raman light path and further configured to reflect some of reflected and scattered light from the object 120 such that the power of the light is detected by the light sensor 140.

It is noted that the third beam splitter 163 may be not disposed in the Raman light path, and rather, in a separate light path. Whereas, disposing the third beam splitter in the Raman light path may enable the laser light path and the Raman light path to be at least partly combined, thereby facilitating reduction of the overall dimension of the detection apparatus. It is further noted here that if the third beam splitter 163 is disposed in the Raman light path, as shown in FIG. 1, the first beam splitter 161 and the second beam splitter 162 will transmit therethrough at least part of the laser light reflected and scattered by the object.

In an exemplary embodiment, in order to improve utilization of the laser light from the laser 110, the first beam splitter 161 includes a highly reflective film having a high reflectivity to laser light having a predetermined wavelength, for reflecting most of the laser light to the object 120. Further, the first beam splitter 161 has a predefined transmittance to the laser light having the predetermined wavelength. It is noted that a specific value of the reflectivity (or transmittance) may be set as required, for example, based on the power of laser light emitted from the laser 110, light sensitivity of the light sensor 140 or the like. For example, in general, the first beam splitter 161 may be provided by a coating, such that it has a reflectivity selected from 70% to 95% (that is, a transmittance of 5% to 30%) for laser light having an incident angle of 45 degrees.

The third beam splitter 163 may include a film or structure having a high reflectivity of laser light, such that a part of the laser light beam transmitted through the first beam splitter 161 and the second beam splitter 162 can be sufficiently or even fully reflected towards the light sensor 140. In order to improve sensitivity and accuracy of the light sensor 140 with respect to detection of light intensity, in an exemplary embodiment, the third beam splitter 163 has a reflectivity of at least 94%, desirably a reflectivity of at least 99.5%, to laser light having a predetermined wavelength and an incident angle of 45 degrees, such that a part, which is transmitted through the first beam splitter 161 and the second beam splitter 162, of the laser light having the wavelength may be sufficiently utilized.

As an example, the third beam splitter 163 may include a long-wave pass dichroic mirror, which has a high reflectivity of laser light emitted from the laser 110 and having a predetermined wavelength and allows Raman scattering light generated after Raman scattering of the laser light and having a larger wavelength to be transmitted therethrough. A specific threshold of the long-wave pass dichroic mirror may be set as required (for example, based on one or more parameters such as the wavelength of the laser light emitted from the laser 110). In embodiments of the present disclosure, the third beam splitter 163 is not limited to the long-wave pass dichroic mirror, and the above function of the third beam splitter 163 may be achieved by selecting another known beam splitting arrangement.

With provision of the third beam splitter 163, the power detection light path and the Raman light path may be at least partly combined, thereby facilitating reduction of the overall dimension of the detection apparatus.

In a further embodiment, the optical devices may include one or more other optical members, in addition to the first beam splitter 161, the second beam splitter 162 and the third beam splitter 163.

For example, as shown in FIG. 1, the detection apparatus 100 may further include a first filter 164 disposed in the Raman light path at a position downstream of the first beam splitter 161 and configured to filter out Rayleigh light or other stray light from a light signal having passed through the first beam splitter 161, thereby reducing disturbance Rayleigh light or other stray light to the Raman spectrometer. In an exemplary embodiment, the first filter 164 may include a long wave-pass filter or a notch filter.

In a further embodiment, as shown in FIG. 1, the detection apparatus 100 may include a second filter 165 disposed in the laser light path at a position upstream of the first beam splitter 161 (that is, between the laser 110 and the first beam splitter 161) and configured to limit the wavelength of the laser light emitted by the laser 110 within a desired wavelength band. In an exemplary embodiment, the second filter 165 may include a narrow band filter.

In a further embodiment, as shown in FIG. 1, the detection apparatus 100 may include a third filter 166 disposed in the imaging light path at a position downstream of the second beam splitter 162 (that is, between the second beam splitter 162 and the imaging device 180) and configured to filter out stray laser light from the object 120, thereby avoiding unnecessary disturbance or damage to the imaging device 180 during imaging of the object 120 by the imaging device 180. In an exemplary embodiment, the third filter 166 may for example include a notch filter configured to filter out stray light of the laser light during detection operation of the detection apparatus 100 so as to prevent the stray light entering and damaging the imaging device 180.

In a further embodiment, as shown in FIG. 1, the detection apparatus 100 may further include a first convergent lens (or lens set) 181 disposed between the second beam splitter 162 and the object 120 to be detected, a second convergent lens (or lens set) 182 disposed between the imaging device 180 and the second beam splitter 162, a third convergent lens (or lens set) 183 disposed between the Raman spectrometer 130 and the first beam splitter 161, and/or a fourth convergent lens (or lens set) 184 disposed between the light sensor 140 and the third beam splitter 163. The first convergent lens (or lens set) 181 may be used for imaging of the object 120 by the imaging device 180, and also for collecting scattered Raman light from the object 120 such that more scattered Raman light may be transmitted to the Raman spectrometer, thereby facilitating improvement of sensitivity and accuracy of detection of the detection apparatus 100. The second convergent lens (or lens set) 182 may be used for imaging of the object 120 by the imaging device 180. The third convergent lens (or lens set) 183 may be used for converging light such that more scattered Raman light may be converged to enter the Raman spectrometer, thereby facilitating improvement of sensitivity and accuracy of the detection apparatus 100. The fourth convergent lens (or lens set) 184 may be used for converging light such that more laser light reflected from the third beam splitter are converged to enter the light sensor 140, thereby facilitating improvement of detection sensitivity and accuracy of the light sensor 140.

Each of the above first to fourth convergent lenses or lens sets may include a single convex lens shown in FIG. 1, or may include a lens set composed of a plurality of lenses and having a light converging function.

According to an embodiment, as shown in FIG. 1, the detection apparatus 100 may include a lighting device 190 configured to illuminate the object 120 to be detected. Generally, the detection apparatus 100 has a detection end, and the object 120 to be detected is positioned close to the detection end, and thus it may not be possible to provide sufficient illumination to a portion to be detected of the object 120 by an external light source. Provision or integration of the lighting device 190 within the detection apparatus 100 will be favorable for the imaging device 180 to obtain a clear image of the object 120 to be detected. The lighting device 190 may be provided within the detection apparatus 100 at a position close to the detection end; for example, as shown in FIG. 1. The lighting device 190 may be arranged between the second beam splitter 162 and the object 120 to be detected, at a position upstream or downstream of the first convergent lens or lens set 166. In other embodiments, the lighting device may be arranged at any suitable position within the detection apparatus 100. The lighting device 190 may include, for example, one or more LED lamps.

According to an aspect of the present disclosure, there is provided a detection method. According to a general concept of the present disclosure, the detection method may mainly include the following steps: obtaining a reference image; obtaining a real-time image of the object in real time during emitting of laser light for detection; comparing the real-time image to the reference image; and controlling the operation of the detection apparatus based on a comparison result between the real-time image and the reference image.

The detection method may be implemented mainly in the following ways, which will be described in detail hereinafter.

Figure 2:
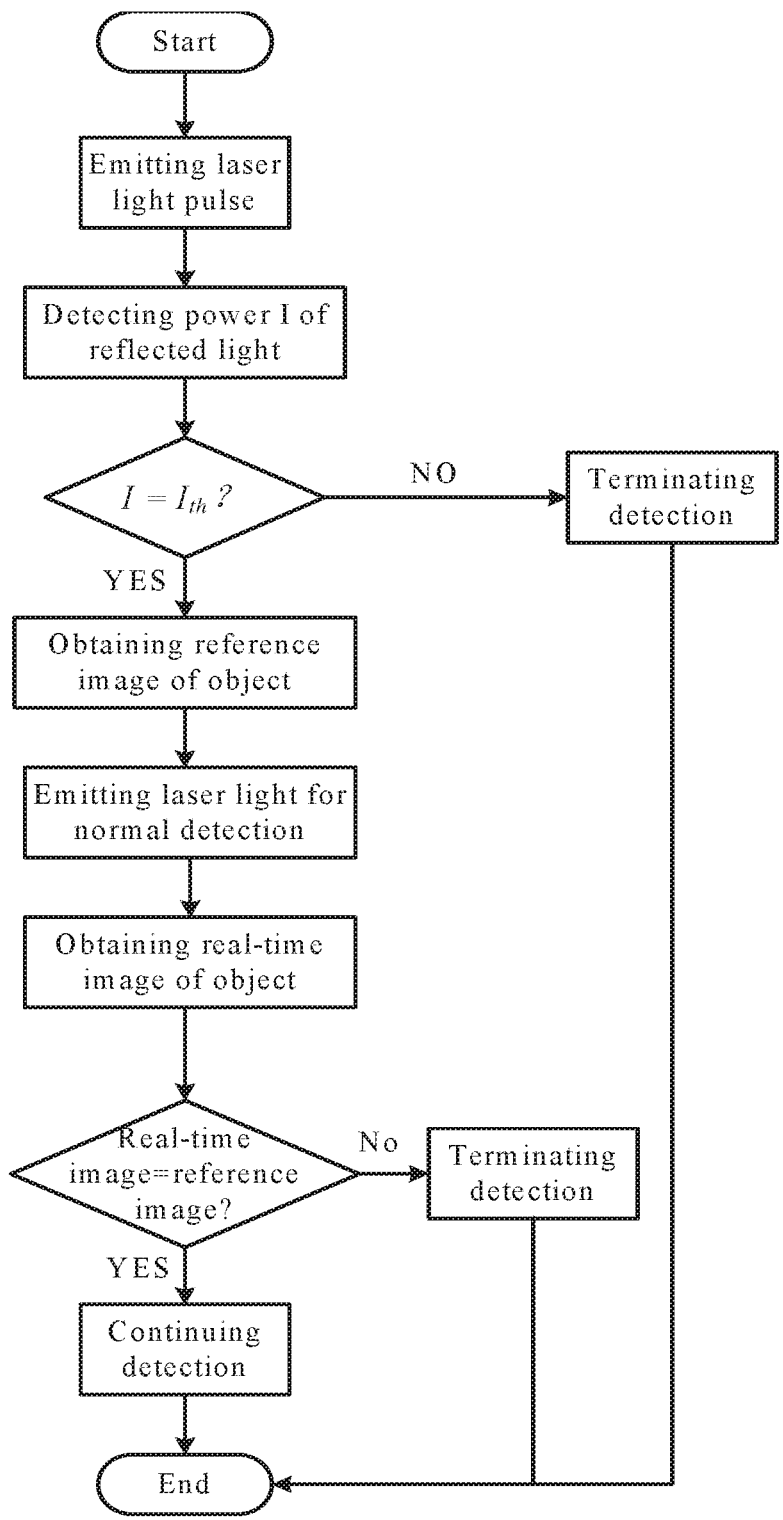
FIG. 2 is a flow chart schematically showing a detection method according to an embodiment of the present disclosure.

FIG. 2 is a flow chart schematically showing a detection method implemented by using the detection apparatus is described herein, according to an embodiment of the present disclosure. As shown in FIG. 2, after starting the detection apparatus 100 (or after starting a detection procedure), the detection method may include following steps:

emitting, to an object 120 to be detected, a laser light pulse for pre-detection;

receiving reflected laser light and scattered laser light coming from the object 120 and generated under the laser light pulse, and determining power I of the reflected and scattered laser light;

comparing the determined power I to threshold power $I_{th}$;

performing a normal detection if, e.g., the determined power I is greater than or equal to the threshold power $I_{th}$; and terminating the detection if, e.g., the determined power I is smaller than the threshold power $I_{th}$, wherein performing a normal detection includes:

obtaining an image of the object to be detected as a reference image before emitting of the laser light;

obtaining a real-time image of the object in real time during emitting of the laser light for detection;

comparing the real-time image to the reference image; and controlling the operation of the detection apparatus according to a comparison result of the real-time image to the reference image.

In an exemplary embodiment, the step of controlling the operation of the detection apparatus according to a comparison result of the real-time image to the reference image may include:

continuing the detection if the real-time image is the same or substantially the same as the reference image; and terminating the detection if the real-time image is obviously different from the reference image.

It will be understood that after comparing one frame of the real-time image of the object 120 to the reference image, the imaging device 180 may continue to obtain a next frame of the real-time image of the object 120 to compare it with the reference image if the detection continues to be performed. A time interval between two adjacent frames of the real-time image may be set as required. If each frame of the real-time image is the same or substantially the same as the reference image, the detection apparatus may continue to operate unit the detection is finished.

The operation of the detection apparatus 100 ends (or the detection procedure ends) after the detection is finished or terminated.

The step of comparing the real-time image to the reference image may be implemented in various ways.

In an exemplary embodiment, the step of comparing the real-time image to the reference image may include:

determining gray scale values of respective pixels of the reference image;

determining gray scale values of respective pixels of each frame of picture in the real-time image;

comparing the gray scale value of each of the pixels of each frame of picture in the real-time image to the gray scale value of a corresponding one of the pixels of the reference image, so as to determine the number of pixels, the gray scale values of which are changed, of each frame of picture in the real-time image, or to determine a percentage of the number of pixels, the gray scale values of which are changed, of each frame of picture in the real-time image relative to a total pixel number of the real-time image; and comparing the number of pixels, the gray scale values of which are changed, of each frame of picture in the real-time image to a threshold number, or comparing the percentage of the number of pixels, the gray scale values of which are changed, of each frame of picture in the real-time image relative to a total pixel number of the real-time image to a threshold percentage.

The step of controlling the operation of the detection apparatus according to a comparison result of the real-time image to the reference image may specifically include: if the number of pixels, the gray scale values of which are changed, of each frame of picture in the real-time image is smaller than the threshold number or if the percentage of the number of pixels, the gray scale values of which are changed, of each frame of picture in the real-time image relative to a total pixel number of the real-time image is smaller than the threshold percentage (which implies the real-time image is the same or substantially the same as the reference image), instructing the detection apparatus to continue the detection; otherwise, if any of the above-described numbers exceeds a corresponding threshold (which implies the real-time image is significantly different from the reference image), instructing the detection apparatus to terminate the detection.

In an embodiment, the step of comparing the real-time image to the reference image may include:

determining colors of respective pixels of the reference image;

determining colors of respective pixels of the real-time image;

comparing the color of each of pixels in each frame of picture of the real-time image to the color of a corresponding one of pixels of the reference image, so as to determine the number of pixels, the colors of which are changed, in each frame of picture of the real-time image, or to determine a percentage of the number of pixels, the colors of which are changed, in each frame of picture of the real-time image relative to a total pixel number of the real-time image; and comparing the number of pixels, the colors of which are changed, in each frame of picture of the real-time image to a threshold number, or comparing the percentage of the number of pixels, the colors of which are changed, in each frame of picture of the real-time image relative to a total pixel number of the real-time image to a threshold percentage.

The step of controlling the operation of the detection apparatus according to a comparison result of the real-time image to the reference image may specifically include: if the number of pixels, the colors of which are changed, of each frame of picture in the real-time image is smaller than the threshold number or if the percentage of the number of pixels, the colors of which are changed, of each frame of picture in the real-time image relative to a total pixel number of the real-time image is smaller than the threshold percentage (which implies the real-time image is the same or substantially the same as the reference image), instructing the detection apparatus to continue the detection; otherwise, if any of the above-described numbers exceeds a corresponding threshold (which implies the real-time image is significantly different from the reference image), instructing the detection apparatus to terminate the detection.

In an exemplary embodiment, the step of terminating the detection may further include sending out, while or after terminating the detection, an alarm signal so as to warn a relative operator that the detected object may be damaged during the detection.

Figure 3:
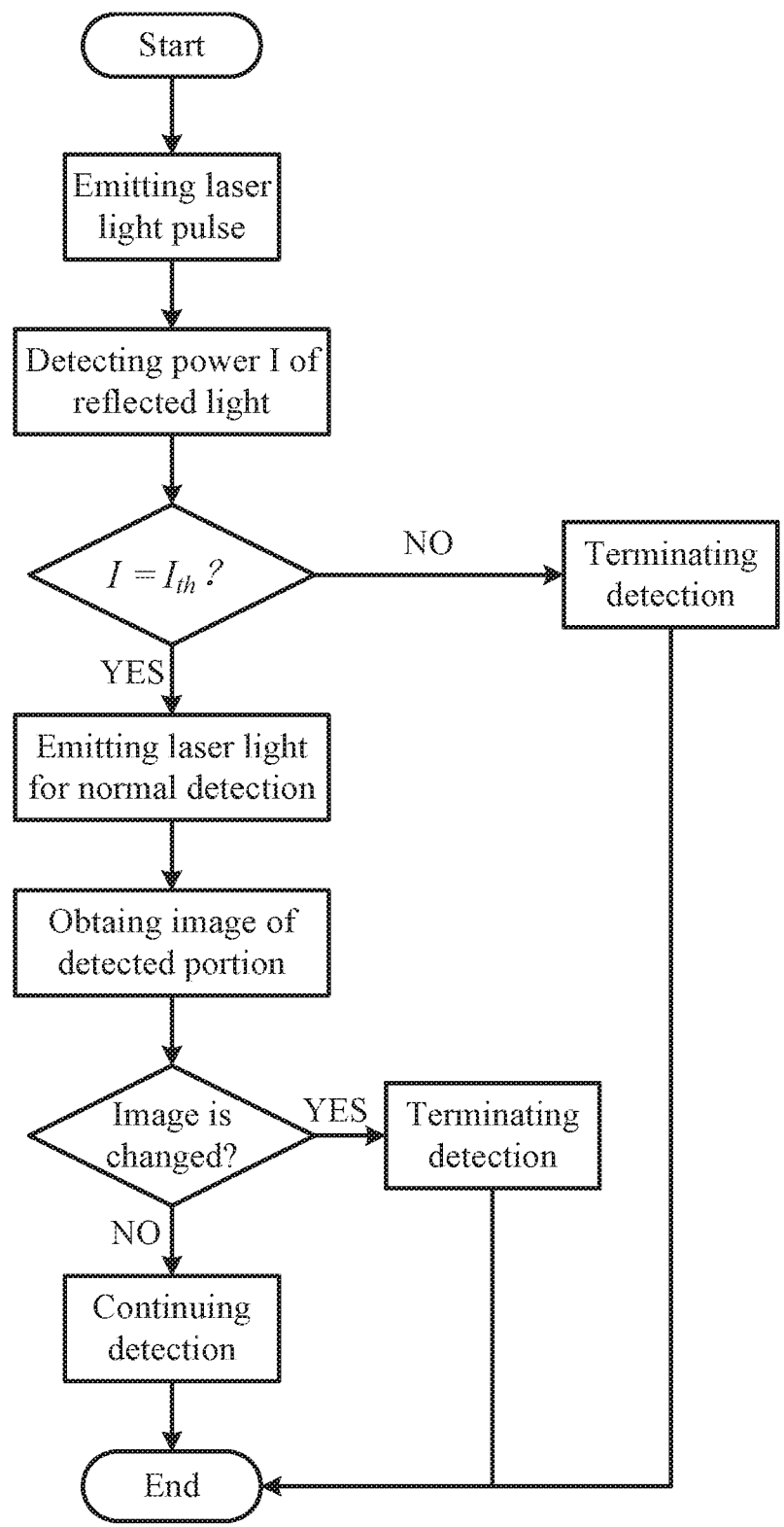
FIG. 3 is a flow chart schematically showing a detection method according to an embodiment of the present disclosure.

FIG. 3 is a flow chart schematically showing a detection method implemented using a detection apparatus described herein, according to an embodiment of the present disclosure. As shown in FIG. 3, after starting the detection apparatus 100 (or after starting a detection procedure), the detection method may include the following steps:

emitting, to an object 120 to be detected, a laser light pulse for pre-detection;

receiving reflected light and backward Rayleigh-scattered light coming from the object 120 and generated under the laser light pulse;

determining power I of the reflected and scattered light;

comparing the determined power I to threshold power $I_{th}$;

performing a normal detection if the determined power I is, e.g., greater than or equal to the threshold power $I_{th}$; and terminating the detection if the determined power I is, e.g., smaller than the threshold power $I_{th}$.

In an example, the step of performing a normal detection includes:

emitting, to the object to be detected, laser light for detection;

obtaining a real-time image of the object in real time during emitting of the laser light for detection, and taking a first frame of picture of the real-time image as a reference image;

comparing another frame of picture of the real-time image to the first frame of picture; and controlling the operation of the detection apparatus according to a comparison result of the other frame of picture of the real-time image to the first frame of picture.

In an exemplary embodiment, the controlling the operation of the detection apparatus according to a comparison result of the other frame of picture of the real-time image to the first frame of picture may include:

continuing the detection if the other frame of picture of the real-time image is the same or substantially the same as the first frame of picture; and instructing the laser to stop emitting laser light and terminating the detection if the other frame of picture of the real-time image is significantly different from the first frame of picture.

In this embodiment, the step or principle of determining whether or not the other frame of picture of the real-time image is the same or substantially the same as, or is significantly different from, the first frame of picture may be the same as those of above-described embodiments and will not be repeated here.

The above detailed description has explained various embodiments of the above Raman spectrum inspection apparatus and monitoring method thereof by schematic views, flow charts and/or examples. In case that the schematic views, flow charts and/or examples each include one or more functions and/or operations, the skilled person in the art should understand that each function and/or operation in such schematic views, flow charts and/or examples may be implemented separately and/or collectively by various structures, hardware, software, firmware or any combination of them. In an embodiment, some parts of an embodiment of the present disclosure may be implemented by Application Specific Integrated Circuits (ASIC), Field Programmable Gate Arrays (FPGA), Digital Signal Processors (DSP) or other integrated forms. However, the skilled person in the art should understand that some aspects of the embodiments disclosed herein may be implemented equally in an integrated circuit entirely or partly, implemented as one or more computer programs running on one or more computers (for example, implemented as one or more programs running on one or more computer systems), implemented as one or more programs running on one or more processors (for example, implemented as one or more programs running on one or more microprocessors), implemented as firmware, or implemented as any combination of the above methods. From the present disclosure, the skilled person in the art has capability of designing circuits and/or writing software and/or firmware codes. Furthermore, the skilled person in the art will appreciate that the mechanism of the subject of the present disclosure may be delivered as various forms of program products, and the exemplified embodiments of the present disclosure may be applicable independent of the specific types of the signal carrying media that perform the delivery in practice. Examples of the signal carrying media include, but not limited to: recordable media, such as a floppy disc, a hard disk drive, an optical disc (CD, DVD), a digital magnetic tape, a computer memory or the like; or transmission media such as digital and/or analog communication media (for example, an optical fiber cable, a wave guide, a wired communication link, a wireless communication link or the like).

Although exemplary embodiments of the present disclosure have been illustrated in the drawings, it will be understood by those skilled in the art that the present disclosure may be still implemented even if one or more unnecessary members/parts are omitted. Although several exemplary embodiments of the present disclosure have been described with reference to the drawings, it will be appreciated by those skilled in the art that modifications and variations may be made in these embodiments without departing from the principles and spirit of the general inventive concept of the present disclosure, the scope of which is defined in the appended claims and their equivalents.

What is claimed is:

1. A detection apparatus, comprising:
   a laser configured to emit laser light towards an object to be detected;
   a Raman spectrometer configured to receive Raman light from the object;
   an imaging device disposed independently of the Raman spectrometer and configured to obtain an image of the object;
   a light sensor configured to receive light reflected and scattered by the object under irradiation of the laser light; and
   a controller configured to determine the power of the received light, and to control an operation of the detection apparatus based on the image obtained by the imaging device and the determined power.

2. The detection apparatus according to claim 1, wherein the controller is further configured to compare the power determined by the light sensor to a threshold power, and to control the operation of the detection apparatus according to a comparison result of the power determined by the light sensor to the threshold power.

3. The detection apparatus according to claim 2, wherein the detection apparatus further comprises a fixing device configured to position the object such that a surface to be detected of the object is essentially perpendicular to a direction of the laser light irradiated onto the surface.

4. The detection apparatus according to claim 1, wherein the imaging device is further configured to obtain the image of the object as a reference image before the laser emits the laser light, and to obtain a real-time image of the object in real time while the laser emits the laser light for detection; and
   the controller is further configured to compare each frame of picture of the real-time image to the reference image, and to control the operation of the detection apparatus according to a comparison result of the frame of picture of the real-time image to the reference image.

5. The detection apparatus according to claim 4, wherein the detection apparatus further comprises a fixing device configured to position the object such that a surface to be detected of the object is essentially perpendicular to a direction of the laser light irradiated onto the surface.

6. The detection apparatus according to claim 1, wherein the imaging device is further configured to obtain a real-time image of the object in real time while the laser emits the laser light for detection of the object; and
   the controller is further configured to compare a first frame of picture, as a reference image, of the real-time image to one or more other frames of picture of the real-time image, and to control the operation of the detection apparatus according to a comparison result of the one or more other frames of picture of the real-time image to the first frame of picture of the real-time image.

7. The detection apparatus according to claim 6, wherein the detection apparatus further comprises a fixing device configured to position the object such that a surface to be detected of the object is essentially perpendicular to a direction of the laser light irradiated onto the surface.

8. The detection apparatus according to claim 1, further comprising an alarm device, and the controller is further configured to instruct the alarm device to issue an alarm signal while or after instructing the detection apparatus to terminate the detection.

9. The detection apparatus according to claim 1, further comprising a fixing device configured to position the object such that a surface to be detected of the object is essentially perpendicular to a direction of the laser light irradiated onto the surface.

10. The detection apparatus according to claim 9, wherein the fixing device comprises:
a light aperture, through which the laser light emitted by the laser passes to irradiate onto the surface to be detected of the object; and
an inner positioning surface arranged essentially perpendicular to a direction of the laser light passing through the light aperture,
wherein the surface to be detected of the object is arranged to abut against the inner positioning surface.

11. The detection apparatus according to claim 1, further comprising a first beam splitter disposed in a Raman light path from the object to the Raman spectrometer, the first beam splitter configured to guide the laser light emitted from the laser to the object and to transmit Raman light from the object through the first beam splitter to the Raman spectrometer.

12. The detection apparatus according to claim 11, further comprising a second beam splitter disposed in the Raman light path from the object to the Raman spectrometer, the second beam splitter configured to reflect visible light such that the object is imaged by the imaging device and to allow the laser light emitted from the laser and the Raman light from the object to pass through the second beam splitter.

13. The detection apparatus according to claim 12, further comprising a third beam splitter disposed in the Raman light path from the object to the Raman spectrometer at a position downstream of the first beam splitter and the second beam splitter, the third beam splitter configured to reflect, towards the light sensor, portions of the laser light reflected and scattered by the object and transmitted through the first beam splitter and the second beam splitter, and to allow the Raman light from the object to pass through the third beam splitter to the Raman spectrometer.

14. The detection apparatus according to claim 13, further comprising at least one selected from the following:
a first filter disposed in the Raman light path at a position downstream of the third beam splitter, and configured to filter out Rayleigh light of a light signal;
a second filter disposed between the laser and the first beam splitter and configured to limit a wavelength of the laser light emitted by the laser within a desired wavelength band; and/or
a third filter disposed between the imaging device and the second beam splitter and configured to filter out the laser light.

15. The detection apparatus according to claim 14, further comprising at least one selected from the following:
a first convergent lens or lens set disposed between the second beam splitter and the object;
a second convergent lens or lens set disposed between the imaging device and the second beam splitter;
a third convergent lens or lens set disposed between the Raman spectrometer and the third beam splitter; and/or
a fourth convergent lens or lens set disposed between the light sensor and the third beam splitter.

16. The detection apparatus according to claim 11, wherein the first beam splitter has a transmittance selected from a range of 5% to 30% for laser light having an incident angle of 45 degrees.

17. The detection apparatus according to claim 1, further comprising a light source configured to illuminate the object.

18. A detection method implemented by using the detection apparatus of claim 1, the method comprising:
emitting, to the object to be detected, a laser light pulse for pre-detection;
receiving reflected laser light and scattered laser light coming from the object and generated under the laser light pulse;
determining the power of the reflected laser light and the scattered laser light;
comparing the determined power to a threshold power;
performing a normal detection responsive to the determined power crossing or equaling to the threshold power; and
terminating the detection responsive to the determined power not crossing or equaling to the threshold power,
wherein the performing a normal detection comprises:
obtaining an image of the object to be detected as a reference image before emitting of the laser light;
obtaining a real-time image of the object in real time during emitting of the laser light for detection;
comparing the real-time image to the reference image; and
controlling the operation of the detection apparatus according to a comparison result of the real-time image to the reference image.

19. The detection method according to claim 18, wherein the comparing the real-time image to the reference image comprises comparing colors of pixels of the real-time image to colors of pixels of the reference image, or comparing gray scale values of pixels of the real-time image to gray scale values of pixels of the reference image.

20. A detection method by using the detection apparatus of claim 1, the method comprising:
emitting, to the object to be detected, a laser light pulse for pre-detection;
receiving reflected laser light and scattered laser light coming from the object and generated under the laser light pulse;
determining the power of the reflected laser light and the scattered laser light;
comparing the determined power to a threshold power;
performing a normal detection responsive to the determined power crossing or equaling a threshold power; and
terminating the detection responsive to the determined power not crossing or equaling the threshold power,
wherein the performing a normal detection comprises:
obtaining a real-time image of the object to be detected as a reference image before emitting of the laser light;
obtaining a real-time image of the object in real time during emitting of the laser light for detection, and taking a first frame of picture of the real-time image as a reference image;
comparing one or other frames of picture of the real-time image to the first frame of picture; and
controlling the operation of the detection apparatus according to a comparison result of the one or more other frames of picture of the real-time image to the first frame of picture.

* * * * *